April 25, 1933.  W. V. ISGRIG  1,905,590
AUTOMOBILE BUMPER
Filed April 5, 1932
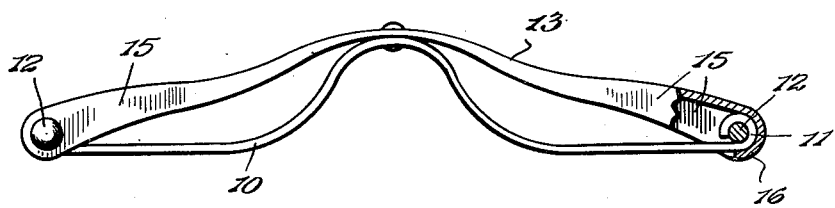
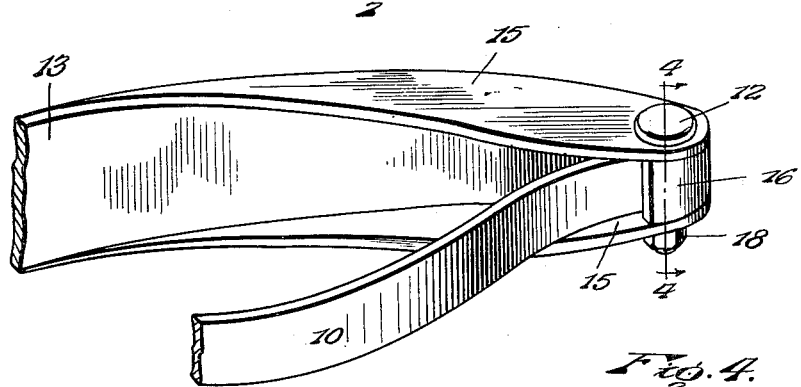
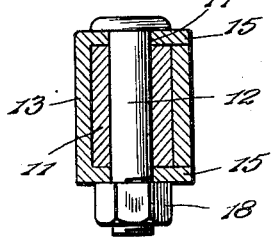
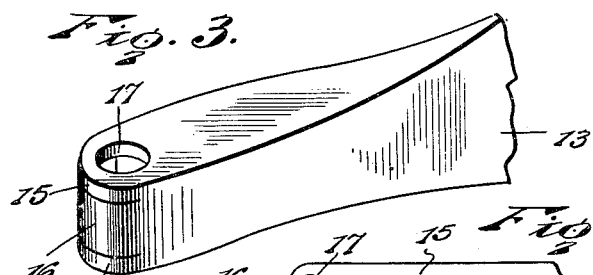
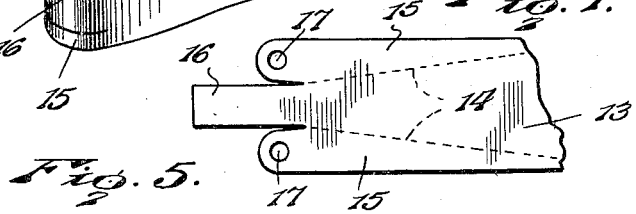
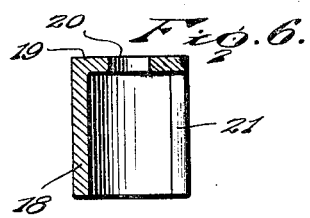
Inventor
W. V. Isgrig.
By Lacey & Lacey, Attorneys Patented Apr. 25, 1933

1,905,590

UNITED STATES PATENT OFFICE

WALTER V. ISGRIG, OF MILWAUKEE, WISCONSIN

AUTOMOBILE BUMPER

Application filed April 5, 1932. Serial No. 603,324.

This invention relates to automobile bumpers and has for an object to provide a bar bumper having a flange or lip folded over at the edge to receive the end bolt and form an abutment against which the hooked end of the mating bumper bar may be snugly confined by tightening the bolt thereby eliminating rattling and loose swivel action of said hooked end.

A further object is to provide a bumper bar of the tapered end type which may be manufactured of strip metal in lieu of the usual expensive method of blanking such bumpers out of sheets.

With the above and other objects in view the invention consists in certain novel details of construction and combinations of parts hereinafter fully described and claimed it being understood that various modifications may be resorted to within the scope of the appended claims without departing from the spirit or sacrificing any of the part of this specification:

In the accompanying drawing forming part of this specification;

Figure 1 is a plan view showing the assembled bumper constructed in accordance with the invention, Figure 2 is a fragmentary perspective view showing the end construction of the bumper, Figure 3 is a fragmentary perspective view showing the end of a bumper bar embodying my improvements, Figure 4 is a cross section taken on the line 4—4 of Figure 2, Figure 5 is a fragmentary perspective view showing a modified form of the bumper and, Figure 6 is a cross section taken on the line 6—6 of Figure 5, and Figure 7 is a fragmentary plan view showing the shape of the bar material from which the flanged bumper bar is formed.

Referring now to the drawing in which like characters of reference designate similar parts in the various views, 10 designates the usual rear supporting back bar of an automobile bumper, the same having hooked ends constituting eyes 11 to receive end bolts 12.

In carrying out the invention I preferably utilize a comparatively wide bar of steel and impart to the same any desired longitudinal curvature to form the front bar 13 of the bumper. The bar of steel is preferably shaped at each end, as shown in Figure 7. Preferably both the upper and lower edge portions at each end of the bar are bent at a right angle to the plane of the bar along oblique lines, indicated at 14 in Figure 7, and extended parallel with each other to provide superposed flanges 15, best shown in Figure 4. As shown in Figure 7 these flanges before being bent into shape are somewhat shorter in length than the length of the bar so that a tongue 16 projects beyond the ends of the flanges. This tongue is bent into arcuate form between the flanges 15, as best shown in Figure 3, and coacts with both flanges in forming a housing for the terminal eye 11 of the back bar 10, as best shown in Figure 1.

The flanges 15 are provided with openings 17 to receive the corresponding end bolts 12. By referring to Figure 4 it will be seen that when the nut 18 of the bolt is tightened the flanges 15 are forced tightly against the upper and lower edges of the eyes 11 and tightly bind the eyes against loose swivel action as well as vertical play thereby eliminating rattles. By virtue of the flanges 15 being bent along the converging lines indicated at 14 in Figure 7, both ends of the bumper bar 13 will be tapered, as best shown in Figure 3, while the flanges also are tapered from the extreme ends in a direction toward the center of the bar, as best shown in Figures 1 and 2. A neat appearing bumper bar is thus produced, while at the same time the flanges are of sufficient area to withstand severe conditions of service.

A modified form of the invention is shown in Figures 5 and 6. This form of the invention dispenses with the bottom flange. As shown, the bumper bar 18 is bent at the edge only to provide a flange 19 which is provided with a bolt opening 20, the tongue 21 being curved underneath the flange in an arc concentric with the bolt opening. As shown, the eye of the back bar is forced into tight engagement with the single flange 19 by tightening of the bolt, to eliminate rattles, as above described.

From the above description it is thought that the construction and operation of my invention will be fully understood without further explanation.

What is claimed is:

1. A bumper bar terminally bent along an oblique line at the longitudinal edge to provide a flange tapering from its extremity toward the center of the bumper bar, the extreme end of the bar being reversely bent to provide a tongue at the extremity of the flange, said flange being provided with a bolt opening adjacent said tongue.

2. A bumper bar having an extreme end bent along converging lines at the longitudinal edges to provide superposed flanges tapering from their extremities toward the center of the bumper bar, the end of the bumper bar between said flanges being reversely bent to provide a tongue bridging both flanges at the extreme ends thereof, said flanges being provided with bolt openings within the enclosure of said tongue.

3. A bumper bar having tapered ends provided with flanges extending at a right angle to the plane of the bar and tapered from their extremities toward the center of the bar, curved tongues on the ends of the bumper bar extending along said flanges, said flanges being provided with bolt openings concentric with said tongues.

4. A bumper for automobiles comprising a supporting bar having terminal eyes, a bumper bar having tapered ends provided with flanges tapering from their extremities toward the center of the bar and engaging said eyes, bolts passed through said eyes and through said flanges to tightly bind the eyes against the flanges, and tongues on the extremities of the last named bar embracing said eyes.

In testimony whereof I affix my signature.

WALTER V. ISGRIG.